(12) United States Patent
Vassilvtskii et al.

(10) Patent No.: US 9,626,781 B2
(45) Date of Patent: Apr. 18, 2017

(54) SELECTING CONTENT ITEMS TO PRESENT WITH A MAP

(71) Applicant: Google Inc., Mountain View, CA (US)

(72) Inventors: Sergei Vassilvtskii, San Francisco, CA (US); Mohammad Mahdian, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 36 days.

(21) Appl. No.: 14/682,563

(22) Filed: Apr. 9, 2015

(65) Prior Publication Data

US 2016/0300371 A1 Oct. 13, 2016

(51) Int. Cl.
*G06T 11/20* (2006.01)
*G06Q 30/02* (2012.01)

(52) U.S. Cl.
CPC ........ *G06T 11/206* (2013.01); *G06Q 30/0261* (2013.01)

(58) Field of Classification Search
None
See application file for complete search history.

(56) References Cited

U.S. PATENT DOCUMENTS

| 8,126,770 | B2 | 2/2012 | Lim |
| 2008/0281516 | A1 | 11/2008 | Cummings |
| 2009/0198607 | A1 | 8/2009 | Badger et al. |
| 2010/0010934 | A1 | 1/2010 | Barry et al. |
| 2010/0070368 | A1 | 3/2010 | Choi et al. |
| 2011/0055024 | A1 | 3/2011 | Shen |
| 2014/0006160 | A1 | 1/2014 | McDevitt et al. |
| 2014/0180830 | A1 | 6/2014 | Ishii et al. |

FOREIGN PATENT DOCUMENTS

WO 2007/070358 6/2007

OTHER PUBLICATIONS

Mahdian et al., "Advertising on Maps," EC'13, Jun. 16-20, 2013, Philadelphia, PA, vol. X, No. X, Article X, Publication date: Feb. 2014, pp. 1-10.
International Search Report and Written Opinion in International Application No. PCT/US2016/024653, mailed Jun. 10, 2016, 11 pages.

*Primary Examiner* — Michelle Chin
(74) *Attorney, Agent, or Firm* — Fish & Richardson P.C.

(57) ABSTRACT

The subject matter of this specification can be embodied in, among other things, a system includes a map store, a map server, and a content server. The map server identifies a set of content items in which each content item is associated with a geographic location that is presented in a portion of a map, determines, for a given content item, an adjusted value of a given content item based at least in part on a base value for the content given item and a set of adjustment factors for one or more other content items in the set of content items, selects content items from the set of content items based on the adjusted values, and provides data that present the selected content items on the portion of the map presented at the device.

19 Claims, 6 Drawing Sheets

SELECTING CONTENT ITEMS TO PRESENT WITH A MAP

TECHNICAL FIELD

This document relates to information presentation.

BACKGROUND

The rise of the Internet has facilitated easy access to information for millions of people. Some website publishers freely publish their content to increase the number of visitors to their respective websites. For example, some news organizations freely provide news coverage to visitors of their respective websites; and some entertainment related websites freely provide entertainment articles and stories to visitors of their respective websites; etc.

One service that publishers can provide is an online map service. Some maps allow users to view traditional street maps, street maps including representations of the actual buildings, and even satellite images.

SUMMARY

In general, this document describes systems and processes for the presentation of information.

In a first aspect, a computer-implemented method includes identifying a portion of a map for presentation on a device, identifying a set of content items in which each content item is associated with a geographic location that is presented in the portion of the map, determining, for a given content item from the set of content items, an adjusted value of the given content item based at least in part on a base value for the content given item and a set of adjustment factors for one or more other content items in the set of content items, selecting one or more of the content items from the set of content items based on the adjusted values of the one or more content items, and providing, over a network and to the device, data that present the selected content items on the portion of the map presented at the device.

Various implementations can include some, all, or none of the following features. Determining an adjusted value of the given content item based at least in part on a base value for the content given item and a set of adjustment factors for one or more other content items in the set of content items can include determining the base value as the value of displaying the particular content item in the absence of other displayed content items, identifying a first geographic location associated with the given content item, identifying a set of second geographic locations associated with the one or more other content items, for one or more of the other content items identifying a given second geographic location of the set of second geographic locations and corresponding to the other content item, determining a given adjustment factor of the set of adjustment factors, the given adjustment factor corresponding to the other content item and quantifying an effect of the other content item upon the given content item, and determining the adjusted value based on the base value and the set of adjustment factors. The method can also include identifying content item spaces in the map space in which content items can be presented, the content item spaces defining a subset of the map space, wherein the identified content items are provided for presentation in the content item spaces. The method can also include receiving user requests for map directions, the map direction including one or more of a start location on the map and an end location on the map, and selecting the set of content items based on geographic locations associated with the one or more content items and are relevant to one or more of the start location on the map and the end location on the map. The method can also include receiving path data defining directions from the start location on the map to the end location on the map, and selecting the set of content items based on geographic locations associated with the one or more content items are relevant to path data. The set of content items can include content items that are associated with businesses that negatively impact each other. The set of content items can include content items that are associated with businesses that positively impact each other.

In a second aspect, a system includes a map store that stores map data defining a map, a map server in communication with the map store that receives a map request that includes a requested display region from a user device, and identifies a portion of a map for presentation on the user device, the portion of the map being based on the requested display region, and a content server in communication with the map server. The map server performs operations including identifying a set of content items in which each content item is associated with a geographic location that is presented in the portion of the map, determining, for a given content item from the set of content items, an adjusted value of the given content item based at least in part on a base value for the content given item and a set of adjustment factors for one or more other content items in the set of content items, selecting one or more of the content items from the set of content items based on the adjusted values of the one or more content items, and providing, over a network and to the device, data that present the selected content items on the portion of the map presented at the device.

Various embodiments can include some, all, or none of the following features. Determining an adjusted value of the given content item based at least in part on a base value for the content given item and a set of adjustment factors for one or more other content items in the set of content items can include determining the base value as the value of displaying the particular content item in the absence of other displayed content items, identifying a first geographic location associated with the given content item, identifying a set of second geographic locations associated with the one or more content items, for one or more of the other content items identifying a given second geographic location of the set of second geographic locations and corresponding to the other content item, determining a given adjustment factor of the set of adjustment factors, the given adjustment factor corresponding to the other content item and quantifying an effect of the other content item upon the given content item, and determining the adjusted value based on the base value and the set of adjustment factors. The operations can also include identifying content item spaces in the map space in which content items can be presented, the content item spaces defining a subset of the map space, wherein the identified content items are provided for presentation in the content item spaces. The operations can also include receiving user requests for map directions, the map direction including one or more of a start location on the map and an end location on the map, and selecting the set of content items based on geographic locations associated with the one or more content items and are relevant to one or more of the start location on the map and the end location on the map. The operations can also include receiving path data defining directions from the start location on the map to the end location on the map, and selecting the set of content items based on geographic locations associated with the one or more content items are relevant to path data.

In a third aspect, one or more non-transitory machine-readable storage media store instructions that are executable to perform operations including identifying a portion of a map for presentation on a device, identifying a set of content items in which each content item is associated with a geographic location that is presented in the portion of the map, determining, for a given content item from the set of content items, an adjusted value of the given content item based at least in part on a base value for the content given item and a set of adjustment factors for one or more other content items in the set of content items, selecting one or more of the content items from the set of content items based on the adjusted value and bids associated with the one or more content items, and providing, over a network and to the device, data that present the selected content items on the portion of the map presented at the device.

Various embodiments can include some, all, or none of the following features. Determining an adjusted value of the given content item based at least in part on a base value for the content given item and a set of adjustment factors for one or more other content items in the set of content items can include determining the base value as the value of displaying the particular content item in the absence of other displayed content items, identifying a first geographic location associated with the given content item, identifying a set of second geographic locations associated with the one or more content items, for one or more of the other content items identifying a given second geographic location of the set of second geographic locations and corresponding to the other content item, determining a given adjustment factor of the set of adjustment factors, the given adjustment factor corresponding to the other content item and quantifying an effect of the other content item upon the given content item, and determining the adjusted value based on the base value and the set of adjustment factors. The operations can also include identifying content item spaces in the map space in which content items can be presented, the content item spaces defining a subset of the map space, wherein the identified content items are provided for presentation in the content item spaces. The operations can also include receiving user requests for map directions, the map direction including one or more of a start location on the map and an end location on the map, and selecting the set of content items based on geographic locations associated with the one or more content items and are relevant to one or more of the start location on the map and the end location on the map. The operations can also include receiving path data defining directions from the start location on the map to the end location on the map, and selecting the set of content items based on geographic locations associated with the one or more content items are relevant to path data. Identifying one or more content items includes defining an exclusion zone in the map space, identifying excluded content items that are excluded from the exclusion zone, and precluding the excluded content items from presentation in the exclusion zones.

The systems and techniques described here may provide one or more of the following advantages. First, a system can increase the aesthetical appeal of maps by selectively reducing the number of advertisements that are shown. Second, the system can increase the usefulness of maps by selectively preventing advertisements from obscuring map landmarks. Third, the system can provide increased advertising value to advertisers by selectively discounting and selecting advertisements to be presented when multiple advertisements for multiple advertisers are available for a selected map view.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for presenting information, such as advertisements, on an online map. In general, online maps can be panned, scrolled, and zoomed in a highly dynamic manner. Depending on a user's view of a map, different combinations of locations can be shown. Similarly, different combinations of advertisements associated with those locations can also be shown depending on the user's view of the map and the amount of display space available for advertisements. Advertisers can advertise on a map to promote businesses that may satisfy a user's intent, such as to identify a navigational route, to explore a geographical area, or locate desired products or services. These advertisers may also find value in differentiating themselves from other advertisers, and/or from being unique in their local area (e.g., being "the only game in town").

An advertisement on a map can have a positive impact on the user, for example by helping the user solve an intent. As such, the value of presenting that advertisement may increase. But advertisements on a map can also have a negative impact on the user, for example by making the map too visually cluttered and "busy", or by blocking the user's view of other important markers. As such, the value of presenting that advertisement may be reduced.

The value of a map-based advertisement can be influenced by other advertisements that are also displayed. For example, if a first advertisement is placed on a map near the advertisements of other similar businesses, the nearby advertisements can detract from the attention that the first advertisement receives and therefore can reduce its value.

For example, an advertiser associated with a particular location may find that advertising space has more or less value depending on whether one or more competitors' or complimentary businesses' locations are also in the map view (e.g., the value of advertising space for a pizza restaurant may change as the number of competing pizza restaurants advertising within the map view changes). In another example, an advertiser may feel that advertising space has less value if the map view includes locations and/or advertisements with which they do not wish to be associated (e.g., a meditation center may not wish to advertise when the map view can cause ads for a noisy nearby stadium, bar, or race track to also be shown). In yet another example, an advertiser may feel that advertising space has more value if the map view includes locations and/or advertisements with which they wish to be associated (e.g., a restaurant may have a greater desire to advertise when the map view causes a nearby gas station to also be shown, possibly attracting drivers to stop for both fuel and a meal).

Additionally, deciding at what zoom level an ad would appear can also be considered. For example, an advertisement for a single-location business and appearing on a map zoomed out to show the entire continental USA is likely to be of relatively little value to that business. Therefore, to reduce clutter, increase user utility, limit competition, and/or increase advertiser utility, a discount factor can be determined as part of a process to select a subset of places that are heterogeneous and relatively far apart from each other to show on a map.

In general, this document describes processes for determining adjustments to the price of advertising spaces on a map. Adjusted prices for advertisements are based generally on a combination of the value of an advertisement if it were to be displayed by itself (e.g., base value, standalone value), and the quantified effect of one business upon another based on distance (e.g., adjustment factor).

Figure 1:
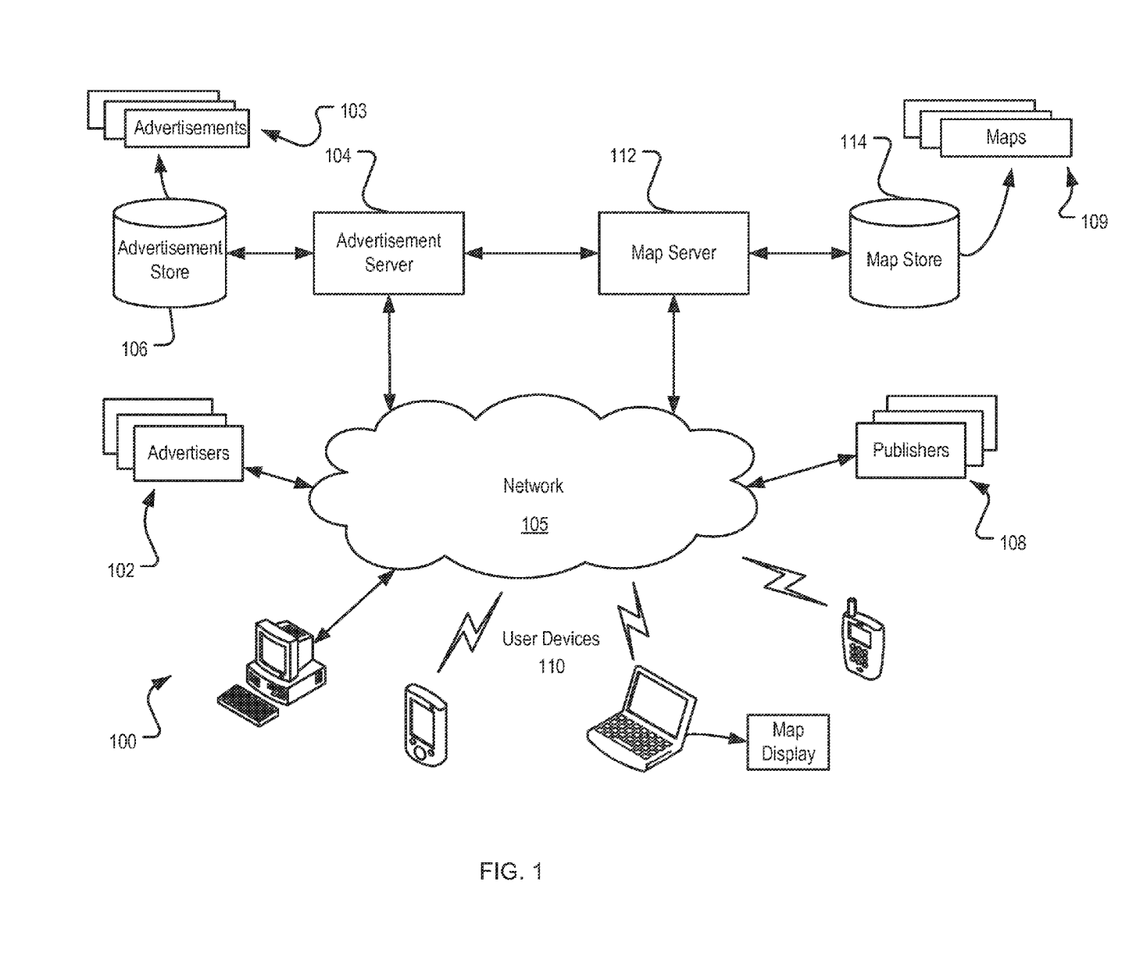
FIG. 1 is a block diagram of an example online map advertising environment.

FIG. 1 is a block diagram of an implementation of an example online map advertising environment 100. In some implementations, advertisers 102 can connect to an advertisement server 104 to upload advertisements 103, track advertising statistics, bid for advertising space, or otherwise interact with the advertisement server 104. The advertisers 102 can connect to the advertisement server 104 through the network 105. The network 105 can be a wide area network, local area network, the Internet, or any other public or private network, or combination of both. While reference is made to an advertisement server 104, other content servers can be implemented in the environment 100.

The advertisements 103 (e.g. content items) may be in the form of graphical advertisements, text only advertisements, image advertisements, audio advertisements, video advertisements, advertisements combining one of more of any of such components, etc. The advertisements 103 may also include embedded information, such as links, meta-information, and/or machine executable instructions. The advertisements 103 can be formatted for presentation in maps 109. The advertisements 103 can be stored in an advertisement store 106 that is connected to the advertisement server 104. While reference is made to advertisements, environment 100 can deliver other forms of content items, including other forms of sponsored content, for presentation with maps.

Publishers 108 can be network content providers that publish maps as part of a map service or publish websites that include maps. The publishers 108 receive requests for content from the user devices 110 and present content in response to the requests. In response to requests, the publishers 108 can provide maps 109, thereby allowing the user devices 110 access to maps 109. User devices 110 can connect to the publishers' map service or websites through the network 105 utilizing any device capable of communicating in a computer network environment, and displaying retrieved information, for example, a web-enabled handheld device, a mobile telephone, a set top box, a game console, a personal digital assistant, a navigation device, a wearable computing device, or a computer.

The request can also include or generate a request for advertisements 103. In these implementations, the map server 112 can request advertisements 103 from the advertisement server 104. The advertisements 103 selected for delivery to the map server 112 can be selected based on their association with the map 109 selected by the map server 112. For example, the advertisements 103 can be associated with the map 109 if the advertiser 102 has a retail location within the map 109 selected.

In some implementations, the request for a map 109 includes a request for advertisements 103, and the advertisements 103 are delivered to the map server 112 by the advertisement server 104. The map server 112 integrates the advertisements 103 into the map 109 by placing the advertisements 103 on the map 109. The advertisements 103 can be placed on the map 109 at a location representative of the location associated with the advertiser 102 (e.g., a map of the retail location of the advertiser). The advertisements 103 can be placed on the map 109 by embedding the advertisement 103 in the map 109, e.g., rendering the advertisement 103 as part of the map 109. In this implementation, the advertisements 103 are subject to any changes affecting the display of the map 109. For example, if the map 109 is displayed at a higher zoom level, the advertisements 103 that are rendered as part of the map 109 will also be displayed at the higher zoom level.

Alternatively, the advertisements 103 can be placed on the map by presenting the advertisements 103 as overlays on the map 109. When the advertisements are presented as overlays on the map 109, they can be maintained in a separate file and do not become part of the map 109. Therefore, the characteristics of the advertisements 103 are independent of the characteristics of the map 109 and a change affecting the display of the map 109 will not necessarily affect the display of the advertisement 103. For example, if the map 109 is displayed at a higher zoom level, the advertisement 103 will not necessarily be displayed at the higher zoom level.

Figure 2A:
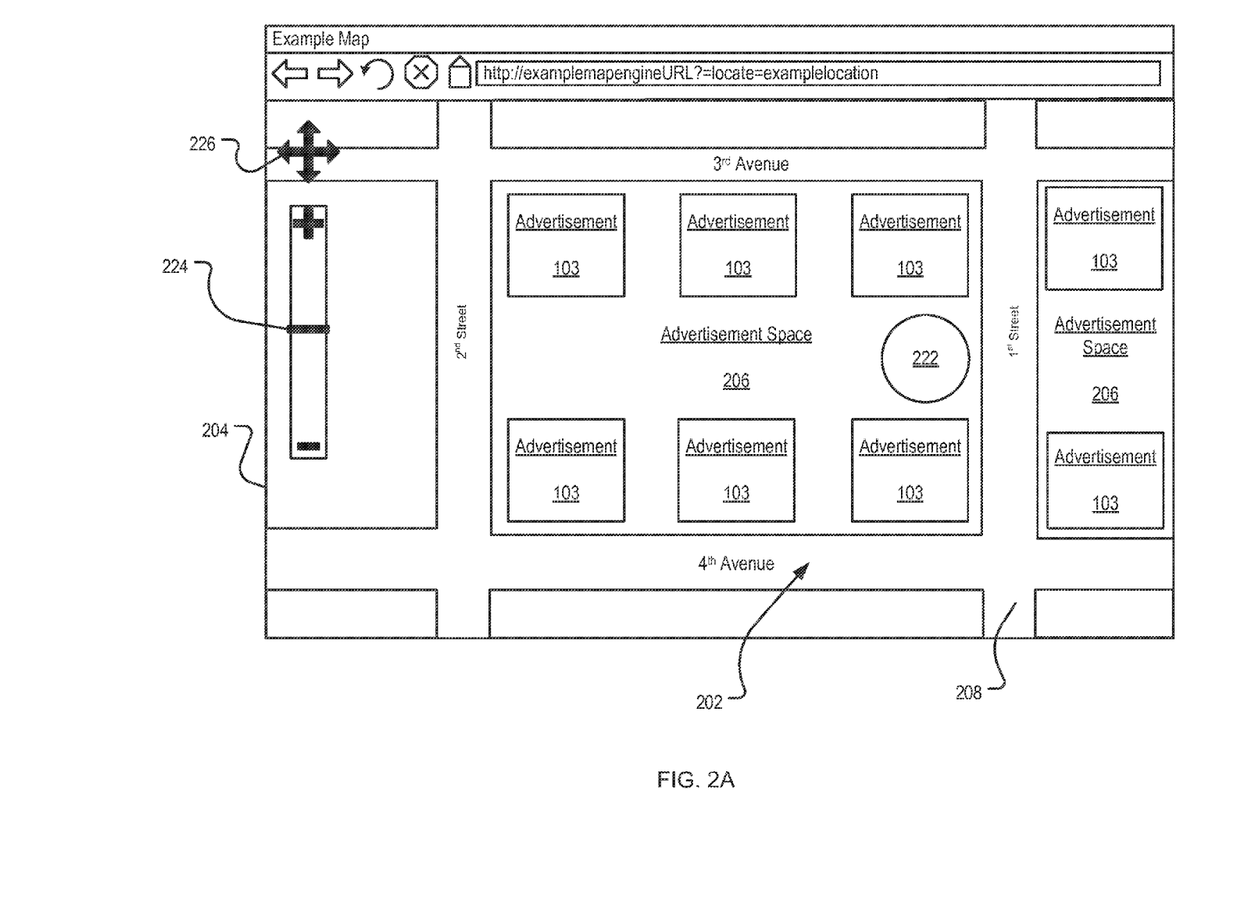
FIG. 2A is an example of a web page that displays advertisements in a map space.

FIG. 2A is an example of a web page that displays advertisements 103 in a map space 202. The map space 202 is the portion of the map 109 selected by the map server 112 that can be displayed on a user device 110. In some implementations, the map space 202 is defined by a display region 204 and a zoom level. The display region 204 is the portion of the user's display that is allocated to present the map space 202. In some implementations, the map space 202 can be further defined by a central point. The central point can be the location of interest (e.g., city center, destination, store location) or any other point within the map space that serves as a reference point.

The map space 202 includes advertisement spaces 206. The advertisement spaces 206 are subsets of the map space 202 that are available for presenting advertisements 103. In some implementations, the advertisement spaces 206 are defined by the road spaces 208. For example, in FIG. 2A, an advertisement space 206 can be the subset of the map space 202 that is bordered on all sides by road spaces 208. Alternatively, advertisement spaces 206 can be the spaces bordered by a combination of road spaces 208 and the borders of the display region 204. The advertisement spaces 206 can vary with the display region 204 and zoom level of the map space 202, and can define the number of advertisements 103 that can be presented in a particular map space 202, as will be discussed. In addition to road spaces 208, other map components can be used to define advertisement spaces 206 (e.g., water, parks, airports, hospitals). While reference is made to advertisement spaces 206, other content item spaces can be defined in the map space 202.

The display region 204 can vary according to a number of factors including display device limitations, user preferences, and publisher preferences, etc. In the example shown, the display region 204 is defined by the size and resolution of the display device. For example, a desktop computer with a 21 inch display and 1280×768 resolution can display more of a map 109 than a web-enabled handheld device having a 3 inch display and 240×240 resolution. Accordingly, the map space 202 that is selected for presentation to different user devices 110 will likely be different when the display region 204 and resolution of each user device 110 is different.

Additionally, user preferences can affect the display region 204 available to present map spaces. User devices 110 can have user preference settings that define the display region 204 and resolution. For example, a user device 110 displaying a web page on a 21 inch display device can have a limited display region 204 if the application window containing the display region 204 is resized to occupy less than the entire display. Similarly, if the user device 110 is displaying multiple windows within the 21 inch display or otherwise is not maximizing the window displaying the web page, the display region 204 may be limited. The user device 110 can also be configured by the user to operate at a lower resolution than the maximum available resolution, resulting in less information being displayed.

Further, the display region 204 can vary according to publisher preferences. Some publishers 108 design web pages to incorporate map spaces according to design specifications that enable a variety of information to be displayed on a single page (e.g., content, advertisements, links). Accordingly, the portion of each web page allocated for displaying the display region 204 may vary according to the display region defined in the design specifications and allocated by the publishers 108. For example, a publisher 108 that provides a map service or publishes web pages dedicated to displaying maps may allocate a large portion of the web page as the display region 204, as shown in FIG. 2A, while utilizing a small portion of the display for other information such as hyperlinks to other web pages.

Figure 2B:
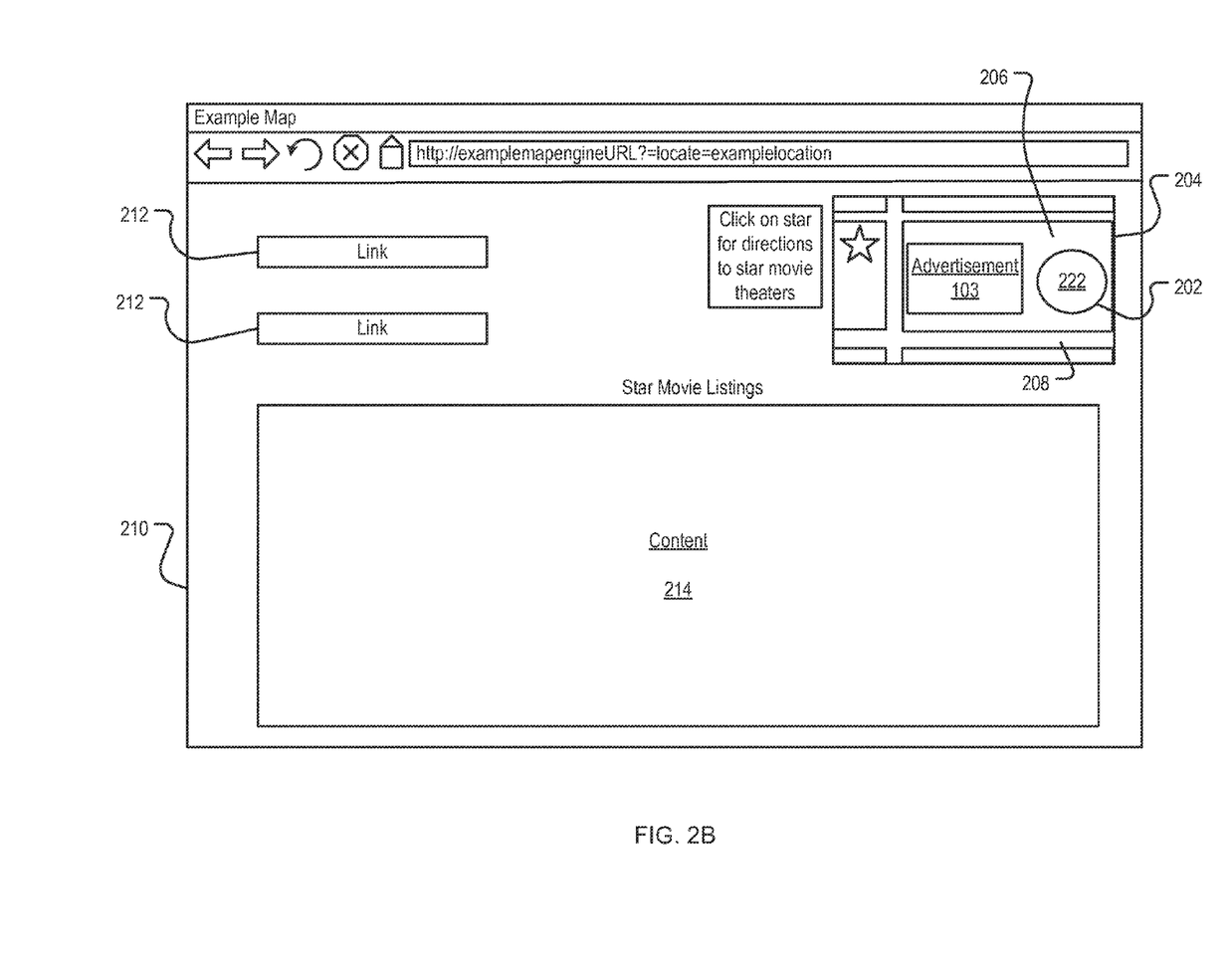
FIG. 2B is an example of a map space incorporated into a general content website.

An example of a publisher 108 that will allocate a large portion of the web page to displaying maps is a map service publisher. In contrast, a publisher 108 that publishes general content web pages may be more inclined to allocate a much smaller portion of the web page as the display region 204 since the map space 202 is only a portion of the information that the publisher 108 is presenting, as shown in FIG. 2B. FIG. 2B is an example of a map space 202 incorporated into a general content website. The display region 204 allocated to display the map space 202 is only a portion of the available display region 210. Therefore, even though a larger display region 204 could be realized, the publisher preferences have limited the display region 204.

An example of a publisher 108 that may allocate a small portion of the web page to display a map 109 is a syndicated map publisher, e.g., movie theatre with a small map of the theatre location on the web page. The map 109 is only a portion of the information that the syndicated map publisher is attempting to provide, so the space on the web page allotted to displaying the map 109 will be smaller. For example, as illustrated in FIG. 2B, the syndicated map publisher may have links 212 to other websites and other content 214 that occupy a large portion of the available display region 210. This leaves a smaller portion of the available display region 210 available for presenting the map space 202.

Figure 2C:
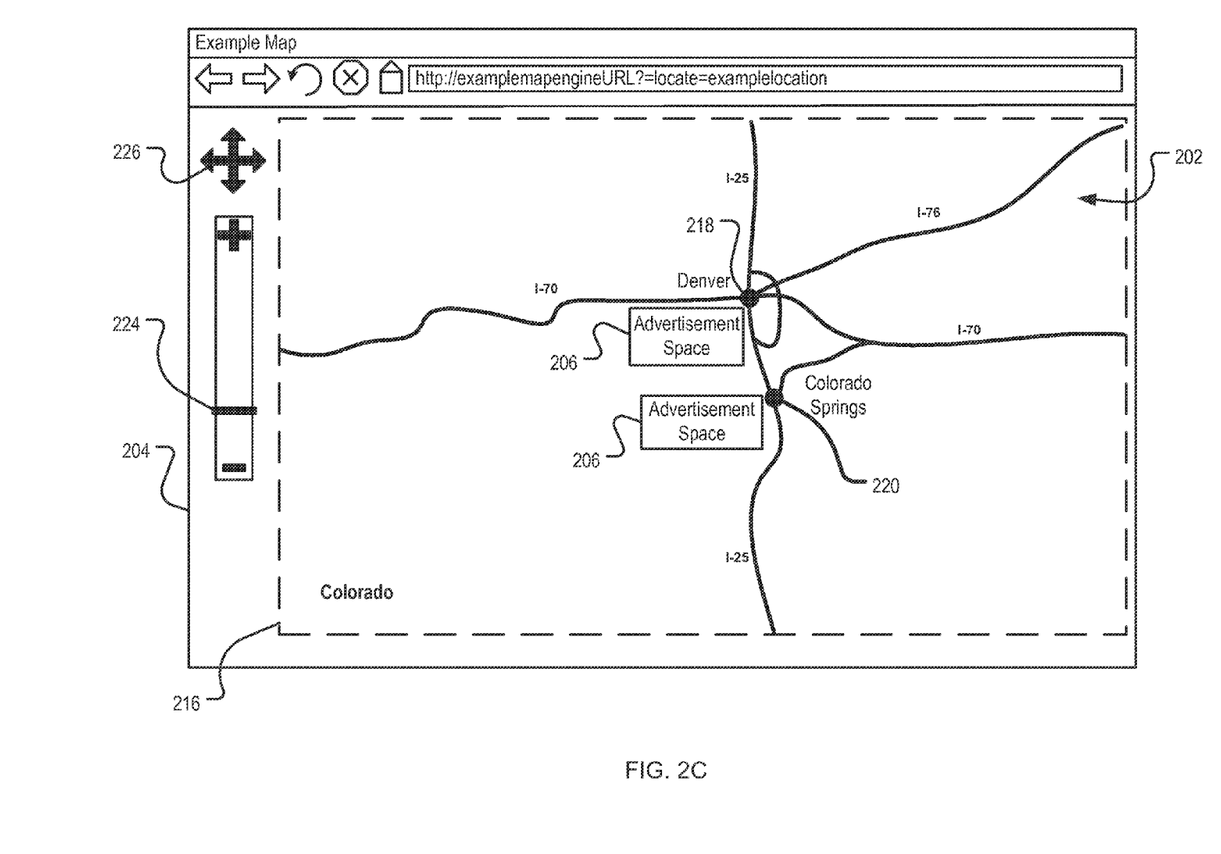
FIG. 2C is an example of a map space presented at a low zoom level.

FIGS. 2A-2C illustrate that the advertisement space 206 for a particular geographic region is defined by the display region 204 and the zoom level associated with the map space request. When a smaller display region is available, less advertisement space 206 will be available. Less available advertisement space 206 can result in fewer advertisements 103 being displayed in the map space 202. For example, in FIG. 2A since the display region 204 is a larger portion of the web page than the display region 204 of FIG. 2B, more advertisements 103 can be displayed in the map space 202 of FIG. 2A. In some implementations, to determine the number of advertisements 103 to include in a particular map space 202 the size of the display region 204 is considered.

In general, the aesthetic quality of a displayed map can have an impact on the value of the map, and in turn any advertisements shown upon it, to a user. In some cases, "less is more", for example, a map space may not need a label for every single business in a commercial area, or every museum in a city. By discriminating, a map maker can accentuate relevant parts of an area, and can give the viewer the right information that he or she is looking for. Aesthetic clutter, however, can degrade the viewer's experience.

For example, consider a map of San Francisco that only labels the iconic San Francisco landmarks, such as the Golden Gate Bridge, Transamerica Pyramid, Coit Tower and the Painted Ladies, versus a map that puts all possible tourist attractions in San Francisco. In the latter case, many of the iconic structures may be rendered almost invisible, and may likely become lost among the more minor points of interest. For example, the Transamerica pyramid may well be hidden by nearby museums. Therefore, the utility gained by labeling an individual point on a map may be quite independent of other points that are labeled. In some examples, the more points that are labeled nearby, the lower the utility to the viewer may be.

In a similar example, the value of the advertising to one business can drop substantially if there is another similar business advertising nearby. For example, two cafés may be located a block away from each other. If the two cafés are in direct competition, each may rather not have their advertisement shown with an advertisement for the other, and therefore the value of an advertisement to each of the advertisers may drop if advertisements for both cafés are present on the same map. In some examples, the similarities between the types of the businesses advertised can also play a role in the change in value of an advertisement. For example, the value drop may be smaller (though likely non-zero) if the other business is a restaurant rather than another café, and may be smaller still if the other business is a hotel. Therefore, to reduce clutter, increase user utility, and/or increase advertiser utility, a subset of places that are heterogeneous and relatively far apart from each other may be selected for presentation in the map space 202.

The number of advertisements 103 presented in the map space 202 can be based, in part, by the zoom level submitted by the user devices 110. The zoom level defines the level of map detail displayed in the map space 202. Each map space request received by the map server 112 includes a zoom level parameter defining the level of detail for the map 109.

For example, if the map space request includes a zoom level parameter that results in a city block being displayed in the display region 204, then a significant amount of detail will typically be included in the map space 202 (e.g. all roads prominently displayed). The map space 202 of FIG. 2A displays a full city block and portions of the surrounding city blocks. At this zoom level, the advertisement spaces 206 can occupy a large portion of the display region 204. As shown, a number of advertisers 102 associated with this city block can have advertisements 103 presented in the map space 202.

In contrast, if the map space request includes a zoom level that enables the entirety of a state to be included in the display region 204, then typically little detail will be included in the map space 202 (e.g., state lines, major highways, and larger cities). FIG. 2C is an example of a map space 202 presented at a low zoom level. The map space 202 of FIG. 2C displays the entire state of Colorado 216. At the selected zoom level the cities of Denver 218 and Colorado Springs 220 are represented on the map by dots. Since each of these cities occupy a small portion of the display region 204, the advertisement spaces 206 associated with these cities can similarly occupy a small portion of the display region 204.

In some implementations, the advertisement server 104 can identify the number of advertisements 103 for presentation in the advertisement spaces 206 based on the selected zoom level and display region 204. The number of advertisements 103 identified for presentation will depend not only on the available advertisement space 206 but also on the size of each advertisement 103. The size of each advertisement 103 can be defined by the advertisement server 104 (e.g., by requiring advertisements 103 submitted by advertisers 102 to have specific dimensions). The advertisement server 104 can also scale advertisements 103 to a uniform size. Alternatively, the advertisement server 104 can use the size of the advertisement 103 as a factor when identifying advertisements 103 for presentation.

In some implementations, the advertisement server 104 can be configured to determine whether the advertisement 103 is related to the advertisement space 206 being auctioned when selecting advertisements that will compete for the advertisement space 206. Geographic locations of businesses can be used to determine whether an advertiser 102 is related to a particular map space 202. For instance, if an advertiser 102 bids on a particular advertisement space 206, but the advertiser 102 does not have an address associated with the advertisement space 206, then the advertisement server 104 can ignore the bid, preventing the advertisement 103 from being presented in the advertisement space 206.

User devices 110 can interact with the map server 112 over the network 105 by using map services. Utilizing these services the user devices 110 can request maps 109 from the map server 112 through various query or browsing methods. For example, user devices 110 can search a particular address or business by directly entering the name of the business or address into a search interface. In this scenario, the map space 202 presented in response to the search can identify the location 222 of the address or business searched, as well as present one or more advertisements 103 within the map space 202.

The user devices 110 can request additional map spaces 202 by entering other queries, using the zoom control 224 to zoom in and zoom out, or using the direction control 226 to directionally pan. For example, as illustrated in FIG. 2C, the user device 110 can submit a new search request for a map of Colorado 216. The corresponding map space 202 presented can have a lower zoom level so that the entire state of Colorado will be displayed in the display region 204.

Similarly, user devices 110 can browse map spaces 202 without first conducting a search by using the zoom control 224 to zoom in and out, and the direction control 226 to directionally pan through the map spaces. User devices 110 requesting map spaces in browse mode can, for example, begin with a default map space 202 presented by the publisher 108, map service or map program that displays a map space including the entire world. The user devices 110 can submit zoom requests to retrieve a map space 202 that displays more detail about the area that they are interested in.

For example, if a user device 110 is initially presented with a map space 202 that presents a map of the world, the user device 110 can submit a new map space request by sliding the zoom control 224 to a higher zoom level, resulting in the presentation of a map space 202 showing Colorado 216, as illustrated in FIG. 2C. To receive an even more detailed map space 202, the user device 110 can submit additional zoom requests using the zoom control 224, and pan requests using the directional control 226 to receive the map space 202 of FIG. 2A. Thus, each zoom instruction and directional pan initiated by the user device 110 corresponds to a new map space request and, in turn, the presentation of another map space 202. Additionally, the new map space request may also result in the selection of new advertisements 103 associated with the map space 202.

As discussed above, the size of the advertisement spaces 206 in each map space 202 can be a factor in determining the number of advertisements 103 to be presented. Further, it is likely that more advertisements 103 will be available for presentation than can be presented in the map space 202. This is particularly true when a map space 202 is presented at a low zoom level because the advertisement space 206 for the region will be smaller (e.g. FIG. 2C). Therefore, in addition to identifying the number of advertisements 103 for presentation in the map space 202, the advertisement server 104 can also identify advertisements 103 for presentation in the map space 202. In one implementation, the identification process can be completed by auctioning the map space 202 to the advertisers 102.

In some implementations, the advertisers 102 can access the advertisement server 104 and submit advertisement bids for the map spaces. For example, the advertisers 102 may be permitted to select, or bid, an amount the advertisers 102 are willing to pay for each presentation of or interaction with (e.g., click) an advertisement 103, e.g., a cost-per-click amount an advertiser pays when, for example, a user device 110 clicks on an advertisement 103. The cost-per-click can include a maximum cost-per-click, e.g., the maximum amount the advertiser 102 is willing to pay for each click of an advertisement 103 based on a keyword, e.g., a word or words in a query. Other bid types, however, can also be used. While reference is made to advertisement bids, other content item bids can be used to auction content item space.

The advertisement server 104 can select the winning bid or bids based on the advertisement bids submitted by the advertisers 102. If the advertisement bids are the only criteria considered, the highest bidders will be selected for presentation in the map space 202.

An advertiser's bid can be considered an indication of the value that the advertiser places on presentation of the advertisement. However, that value may be negatively affected if the advertisement is presented with and/or near advertisements for similar businesses. For example, a business near other businesses in a relatively small geographic area may cater to the same customer base and may find that the advertisement 103 has a reduced value if the advertisement 103 is presented when a user device 110 is accessing a map space 202 at a zoom level that also includes nearby competitors (e.g., inadvertently attracting attention to the competitors).

In some implementations, the advertisement server 104 can estimate a discounted advertisement value (also referred to as an adjusted value) for a business based on an associated zoom level and on the presence or absence of other competing or complimentary advertisers corresponding to the geographic area that the business serves when the advertisement server 104 conducts the auction for map spaces 202, using the discounted advertisement values for available advertisements. Techniques for determining discounts are discussed further in the description of FIG. 3.

As described in more detail below, the advertisement server 104 can determine the adjusted value for an advertisement (or another content item) based on an adjustment factor function. The adjusted value can be combined with click rates, quality scores, conversion rates, and/or any other appropriate techniques that may be used to value advertisements, and used by the advertisement server 104 to select advertisements for presentation in a map. In some implementations, the adjustment factor function can modify (e.g., reduce, discount) the value of an advertisement if placing the advertisement will interfere with the display of important points of interest (e.g., an ad for a Paris restaurant that prevents the location of the Eiffel Tower from being displayed). In such examples, the adjustment (e.g., discount) can depend on the locations of other points of interest that already appear on the map.

In some implementations, the adjustment factor function can modify the value of an advertisement if placing the advertisement on the map will make the map appear cluttered, e.g., as a function of the distance to other nearby POIs and labels. In some implementations, the adjustment factor function can modify the estimated value of an advertisement if the advertised business is very close to other very similar businesses that are also advertising. In such examples, the adjustment factor can be a function of the locations of other points of interest as well as the locations of other advertisers that are competing in the auction. In such cases, a determination can be made with regard to how the discounts are to be aggregated. For example, an adjustment factor function can be configured to focus only on the closest competing point of interest. In another example, the function may be configured to identify all of the nearby points of interest in order to compute the adjustment.

Adjustment factors (e.g., discount factors, bonus factors) can be used to determine how much the value (e.g., the bid) of an advertisement or other content item should be adjusted in a given auction. Assume for purposes of example that multiple content items i are candidates for presentation on a map. Further assume that each of the content items is associated with a base value $v_i$ and a location $(x_i, y_i)$ (e.g., the geographical location of the business described by an advertisement). In some implementations, the base value can be the value for an advertisement as directly given to the system (e.g., the system 100 of FIG. 1) by an advertiser (e.g., the bid value), or the base value could be a value estimated using methods for estimating click-through rates, conversion rates, or any other appropriate technique used to estimate the value of a content item.

Continuing with this example, the value of a first content item (i) can be affected by the presentation of a second content item (j) on the same map. The effect of one content item on another can be quantified using an adjustment factor function $f(w_{ij}, d_{ij})$, which can estimate how much the presence of a content item j affects the value of a content item i. Such adjustment factors can be assigned values between 0 and 1. The term $w_{ij}$ can represent a mathematical weight that indicates how similar the content items i and j are (e.g., $w_{ij}$ varies in proportion to the similarity between the businesses advertised by i and j), and the term $d_{ij}$ can represent the distance between the locations of businesses advertised by content items i and j. An adjusted value for i can be determined by combining the base value with the adjustment factor function:

Adjusted value of $i = v_i * f(w_{ij}, d_{ij})$

This concept can be extended to embodiments in which more than two content items are candidates for display in a map. In such embodiments, a collection of pairwise adjustment factors $\delta_{ij}$ can be identified:

$$\delta_{ij} = f(w_{ij}, d_{ij})$$

In some examples, a form of this function can be used to simplify the estimation of the adjustment factor. For example, in scenarios where all content items are for similar businesses (e.g., all restaurant ads), all values of $w_{ij}$ are equal. Therefore, the weight component can be removed from the adjustment factor function.

Another component of the model determines how the pairwise adjustment factors $\delta_{ij}$ and the values $v_i$ are combined to obtain the discounted value of a content item. A general form of the equation for determining the adjusted value of i can be represented as:

adjusted value of $i = v_i * \delta_i(S)$

Where S represents the set of shown content items, and $\delta_i(S)$ is an aggregation of the pairwise adjustment factors $\delta_{ij}$ for all content items j in S. A particular form that can be used can be represented as:

$$\delta_i(S) = \min_{j \text{ in } S} \delta_{ij}$$

This example form has the feature that the adjustment of a content item's value does not depend on the scale of the map. This form can also simplify allocation processes as well.

Given all the above components, the value of a set S of content items can be represented as:

$$S = \Sigma_{i \in S} v_i * \delta_i(S)$$

In the present example, the equation above can represent a sum of the adjusted values of the content items in S. Once this value function is defined, a content item placement system (e.g., the advertisement server 104) can use any appropriate optimization method (e.g., integer programming tools, brute force algorithms, or heuristic algorithms) to pick a set S that maximizes the above function, and price these content items using pricing methods such as first price, VCG price, or heuristics similar to the generalized second pricing scheme.

In some implementations, the adjustment factor function can be approximated by a parametrized step function that jumps from 0 (e.g., full discount) to 1 (e.g., no discount) at a specific distance R between locations associated with content items. Use of this simplification of the adjustment factor function can yield an allocation that approximately maximizes the social welfare while also being easier to optimize. For example, by using the simplified adjustment function, the maximization problem can approximate an algorithm for finding a maximum weight independent set (e.g., the objective is to select a set of points with the maximum total weight subject to the constraint that no two selected points are within distance R of each other). An approximation algorithm for such a problem is a greedy algorithm that iteratively picks the content item having maximum weight and eliminates all the candidate content items that are associated with locations within distance R of the location associated with the selected content item. An example process can be defined, for example, as:

```
 1:     function PICKANDREMOVE(R)
 2:         C← Set of candidate ads
 3:         S←0
 4:         while C≠0; do
 5:             Let i denote the element of C with the maximum v_i
 6:             S←S ∪ {i}
 7:             C←C \ {j : d_ij < R}
 8:         end while
 9:         return set S of winners
10:     end function
```

Figure 3:
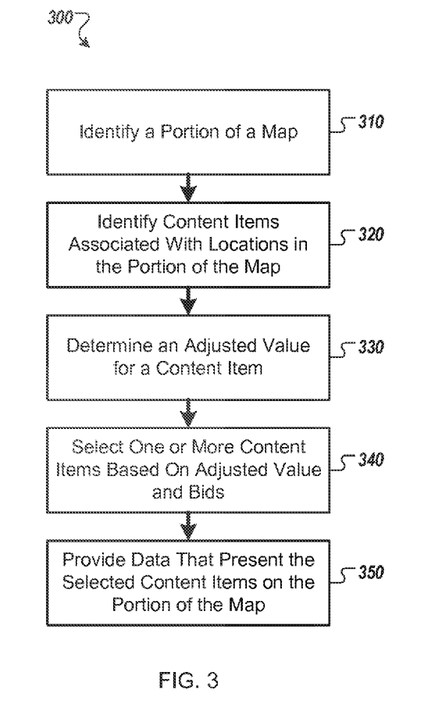
FIG. 3 is a flow diagram of an example process for determining a value of an advertisement on a map.

FIG. 3 is a flow diagram of an example process 300 for determining a value of an advertisement on a map. In some implementations, some or all of the process 300 can be performed by the advertisement server 104, the map server 112, the user devices 110, the advertisers 102, and/or the publishers 108 of the system 100 of FIG. 1.

At 310, a portion of a map is identified for presentation on a device. For example, the map space 202 of FIG. 2A may be identified for presentation on a user device 110 of FIG. 1. The portion of the map can be identified, for example, based on user input as discussed above, For example, the user can submit a request for a map associated with a given address, city, and/or state. Alternatively, the user can be presented an initial map and interact with controls to request presentation of a given portion of the map.

At 320, a set of content items is identified. In some implementations, each content item in the set is associated with a geographic location that is presented in the portion of the map. For example, one or more of the advertisements 103 may be associated with a business that has a physical location (e.g., storefront, business address) that may be included in the map space 202. Each content item can be stored with geographic data specifying the geographic location, such that the content items can be selected for inclusion in the set based, at least in part, on the geographic data.

At 330, for a given content item from the set of content items, an adjusted value of the given content item is determined based on an aggregation of a base value (e.g., $v_i$) for the content given item and a set of adjustment factors for one or more other content items in the set of content items. In some implementations, the base value can be the value of an advertisement if it were to be displayed by itself. In some implementations, the base value can be the value for an advertisement as directly given to the system (e.g., the system 100 of FIG. 1) by an advertiser (e.g., the bid value), or the base value could be a value estimated using methods for estimating click-through rates, conversion rates, or any other appropriate technique used to estimate the value of a content item.

For example, a number of candidate content items (e.g., advertisements), each associated with the geographic location where it should be shown in the map space 202, if selected, can be identified. In some implementations, candidate content items can correspond to a single point or region on the map space 202, for example advertisements can be relatively small markers and/or geometric shapes (e.g., rectangles) that occupy non-trivial areas of the map space 202. The geographic location associated with a selected content item is compared to the geographic locations associated with other content items to determine a set of distances between the geographic location associated with the selected content item and each of the other content items. These distances are used to determine the individual effects (e.g., positive or negative), based on physical distances apart, that two competing or complimentary businesses may have on each other. For example, the effect upon two nearly identical businesses located across the street from each other can be more (e.g., negatively) pronounced than the effect might be upon two nearly identical businesses located in separate towns. In some implementations, the contribution of distance on the value of two content items is inversely proportional to a distance between the locations associated with the content items. The quantified effect of one business upon another based on distance is referred to herein as an adjustment factor.

In some implementations, an adjustment factor can also be based on the competitive or complimentary nature of the two businesses to each other. For example, two pizza restaurants may have an negative effect on each other, whereas a pizza restaurant and a steakhouse may have less of a negative impact upon each other (e.g., competing less directly for hungry customers), and a pizza restaurant and a gas station may have a positive effect on each other that increases with proximity (e.g., a traveler might be more likely to visit if he can get fuel and food with a single stop).

The adjustment factors between a selected content item and other content items is aggregated into an adjusted value. The adjusted value represents the aggregated effect all the other content items upon the selected value if the selected item and the other content items were to all be shown together on the map space 202. In some implementations, the adjusted value can be compared to a base value of the selected content item alone in order to determine a net discount or bonus effect of showing the other content items along with the selected content item. This process can be repeated for some or all of the other content items, to determine adjusted values for those content items as well. The adjusted value is discussed further in the description of FIG. 4.

At 340, one or more of the content items is selected from the set of content items based on the adjusted values of one or more of the content items. For example, the map space 202 may be determined to only have enough space to show two of the advertisement spaces 206 (e.g., FIG. 2C), and the advertiser server 104 and/or the map server 112 may identify the two advertisements out of a collection of advertisements associated with locations in the map space 202 that have the greatest aggregate value based on the adjusted values of the two advertisements in the context of the other advertisements also associated with the map space 202.

At 350, data that present the selected content items on the portion of the map presented at the device is provided over a network to the device. For example, content such as text, images (e.g., banners), video, audio, or other content that is part of the two advertisements discussed in the previous example can be provided to the user device 110 for presentation to the user on the map space 202 in the advertisement spaces 206. In another example, data such as network addresses of advertisements 103 can be provided to the user device 110 in association with the advertisement spaces 206, such that the user device 110 can request the advertisements 103 from the advertisement server 104 and present the advertisements 103 in the advertisement spaces 206 on the map space 202.

In some implementations, the process 300 can include identifying content item spaces in the map space in which content items can be presented, the content item spaces defining a subset of the map space, wherein the identified content items are provided for presentation in the content item spaces. For example, the advertising spaces 206 can be areas within the map space 202 rather than being layered on top of the map space 202.

In some implementations, the process 300 can include receiving user requests for map directions, the map direction including one or more of a start location on the map and an end location on the map, and selecting the set of content items based on geographic locations associated with the one or more content items and are relevant to one or more of the start location on the map and the end location on the map. For example, a user may be planning a road trip, and the map space 202 can display advertisements for a gas station that is near the starting point of the route and display advertisements for hotels that are near the destination. In some implementations, the process 300 can also include receiving path data defining directions from the start location on the map to the end location on the map, and selecting the set of content items based on geographic locations associated with the one or more content items are relevant to path data. For example, a user may be planning a road trip, and the map space 202 may display advertisements for businesses along the route, but not for businesses located a predetermined distance away from the route.

In some implementations, the process 300 can include defining an exclusion zone in the map space, identifying excluded content items that are excluded from the exclusion zone, and precluding the excluded content items from presentation in the exclusion zones. For example in a map of Paris, France, an exclusion zone may be established around the Eiffel Tower such that no advertisement would be presented in a way that would obscure the location of the Tower on the map space 202.

In some implementations, the set of content items can include content items that are associated with businesses that negatively impact each other. For example, the set may include content items for only shoe stores that are in direct competition with each other. In some implementations, the set of content items can include content items that are associated with businesses that positively impact each other. For example, the set may include multiple nightclubs, in which the cumulative attraction of having multiple entertainment options near each other may attract more patrons than if any one of those nightclubs were to advertise by itself.

Figure 4:
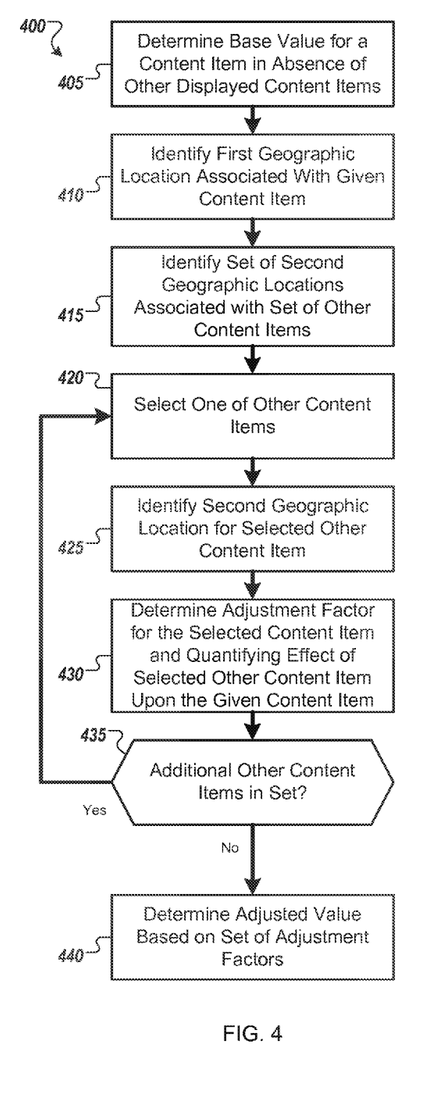
FIG. 4 is a flow diagram of another example process for determining a value of an advertisement on a map.

FIG. 4 is a flow diagram of another example process 400 for determining a value of an advertisement on a map. In some implementations, some or all of the process 400 can be performed by the advertisement server 104, the map server 112, the user devices 110, the advertisers 102, and/or the publishers 108 of the system 100 of FIG. 1. In some implementations, some or all of the process 400 can be performed as step 330 of the process 300 shown in FIG. 3.

At 405, a base value is determined as the value of displaying a particular content item in the absence of other displayed content items from a set of content items. For example, the map space may include locations associated with ten advertisements for ten coffee shops. In aggregate, these coffee shops may have a negative (e.g., discount) effect upon each other with respect to the value of advertising on the map space 202. At 405, the values of one or more of the coffee shops is determined as if the other nine coffee shops did not exist. In some implementations, the base value can be the value of an advertisement if it were to be displayed by itself. In some implementations, the base value can be the value for an advertisement as directly given to the system (e.g., the system 100 of FIG. 1) by an advertiser (e.g., the bid value), or the base value could be a value estimated using methods for estimating click-through rates, conversion rates, or any other appropriate technique used to estimate the value of a content item. These determined values are associated with their respective content items as base values for displaying those respective content items.

At 410, a first geographic location associated with the given content item is identified. For example, the latitude and longitude of one of the ten coffee shops mentioned above can be identified by the advertisement server 104 (e.g., a location identified in a corresponding advertisement 103).

At 415, a set of second geographic locations associated with the one or more other content items is identified. For example the latitudes and longitudes of the remaining nine other coffee shops of the example above can be identified by the advertisement server 104 (e.g., locations identified in corresponding advertisements 103).

At 420, one of the other content items is selected. For example, an advertisement for coffee shop #X of the nine other coffee shops can be selected.

At 425, a given second geographic location of the set of second geographic locations and corresponding to the other content item is identified. For example, the latitude and longitude of coffee shop #X can be identified.

At 430, a given adjustment factor of a set of adjustment factors is determined, the given adjustment factor corresponding to the other content item and quantifying an effect of the other content item upon the given content item. For example, the effect of coffee shop #X on the first coffee shop can be determined as a function of distance between the two coffee shops, and/or of similarity between the two businesses (e.g., both are coffee shops in competition with each other), as discussed above.

At 435, a determination is made. If there are additional content items in the set of content items, then another one of the other content items is selected at step 420. For example, a content item corresponding to coffee shop #Y can be selected to determine an adjustment factor for the combination of the first coffee shop and coffee shop #Y.

If there are no additional content items in the set of content items, then at 440 an adjusted value is determined based on the base value and the set of adjustment factors. For example, the cumulative effect of the adjustment factors for coffee shops #2-#10 relative to the first coffee shop can be combined into a single adjustment value that represents the combined effect (e.g., positive or negative, discount or bonus) of showing an advertisement for the first coffee shop along with advertisements for the other nine coffee shops discussed in this example.

In some implementations, the processes 300 and 400 of FIGS. 3 and 4 for determining adjusted values can be coupled with a pricing scheme to obtain an incentive-compatible content selection process. In general, if the allocation function is monotone then an approximation algorithm can be turned into an incentive compatible content selection process. In the case of displaying content items on maps, the allocation function can be a function that, for a fixed set of bids $v_{-j}$ of advertisers other than i, maps the bid $v_i$ of bidder i to $\delta_i(S)$, where S represents the solution computed with a bid vector $(v_i^*; v_{-i})$. If this function is monotonically non-decreasing, then there is a payment function that is incentive compatible. Since the allocation rule is monotone, there is a process for computing truthful payments that has approximately the same asymptotic running time as the allocation algorithm.

An example pricing process is presented below.

```
1:   function PICKANDREMOVEANDPRICE(R)
2:       Sort candidate ads so that v₁ ≥ v₂ ≥ ... ≥ vₙ
3:       for i = 1→n do
4:           pᵢ ← 0
5:       end for
6:       S ← 0
7:       for j = 1→n do
8:           b ← 0  //b keeps the number of other ads blocking j
9:           for k = 1→j-1 do
10:              if k∈S and d_{kj} < R then
11:                  i ← k
12:                  b ← b+1
13:              end if
14:          end for
15:          if b = 0 then //ad j is not blocked by any other ad
16:              S ← S ∪ {j}
17:          else if b = 1 then //ad j is blocked by a unique ad i
18:              pᵢ ← max{pᵢ; vⱼ}
19:          end if
20:      end for
21:      return set S of winners, price pᵢ * f(min_{j∈S\{i}}{d_{ij}}) for i
22:  end function
```

The algorithm above processes content items in decreasing order of their values for each content item i, and picks the content item unless another content item within distance R is picked before. In addition, whenever the latter event occurs, it attributes the fact that content item i is blocked to the unique picked content item j that is within distance R of i (e.g., if such a unique content item exists; if it does not, the event is not attributed to any content item). The price for a picked content item i is set to approximately the maximum of the values of the content items that are blocked because of i, multiplied by the appropriate adjustment coefficient.

Figure 5:
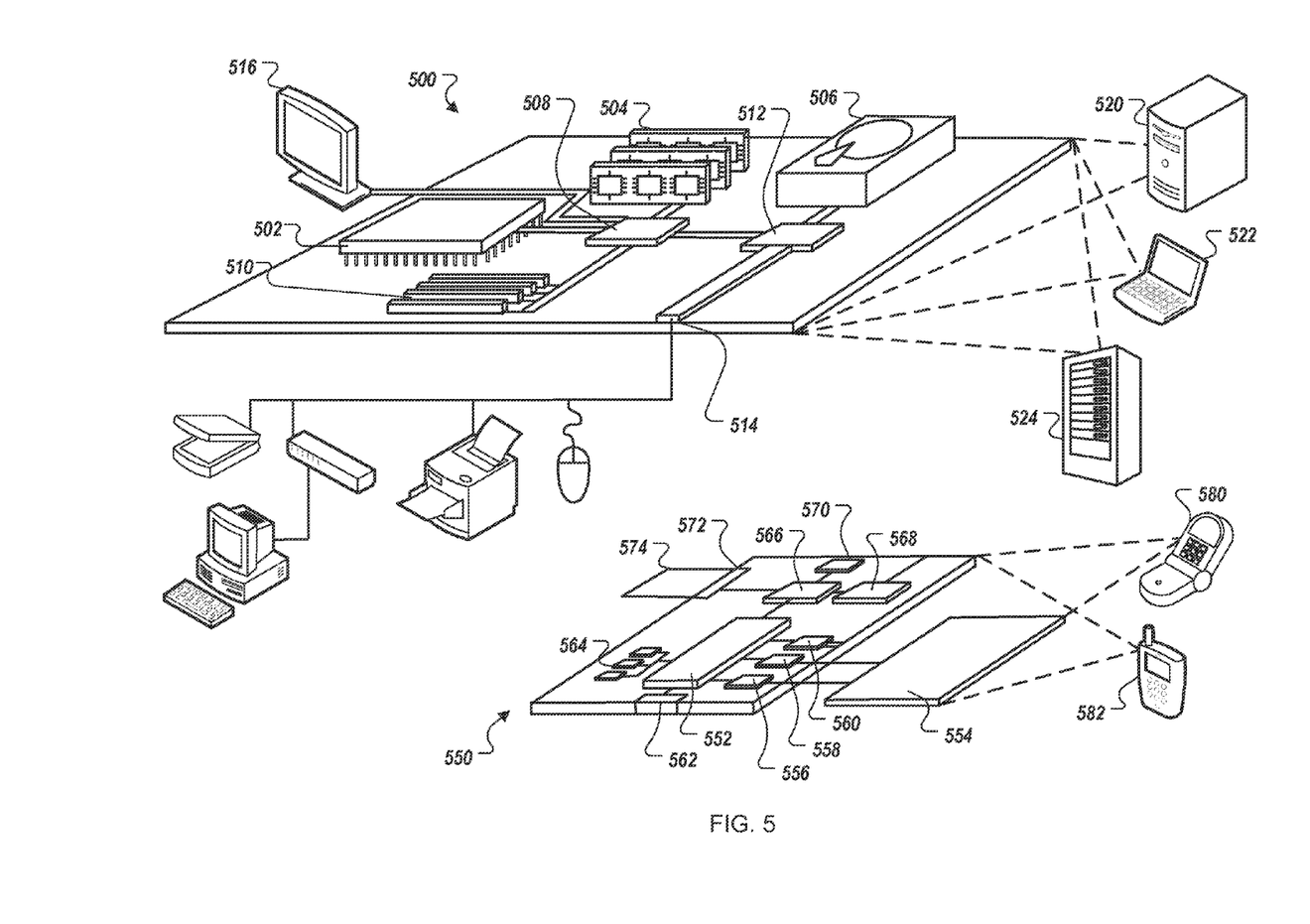
FIG. 5 is a block diagram of an example computer system of an example online map advertising environment.

FIG. 5 is a block diagram of computing devices 500, 550 that may be used to implement the systems and methods described in this document, either as a client or as a server or a collection of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices such as the advertisement server 104, the map server 112, the user devices 110, the advertisers 102, and/or the publishers 108 of the system 100 of FIG. 1. In some embodiments, the computing devices 500, 550 can be used to perform some or all of the processes 300 and/or 400 of FIGS. 3 and 4. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, Voice Over LTE (VOLTE) calls, SMS, EMS, or MMS messaging, CDMA, TDMA, PDC, WCDMA, CDMA2000, GPRS, WiMAX, LTE, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
identifying, by a system of one or more computers, a portion of a geographic map for presentation on an electronic display of a computing device;
identifying, by the system, a set of content items that are candidates for presentation on the portion of the geographic map and that are each associated with a respective geographic location that is located within a geographic area represented by the portion of the geographic map;
identifying, by the system, a distance between a first geographic location that is associated with a first content item of the set of content items and a second geographic location that is associated with a second content item of the set of content items;
determining, by the system and based at least on the distance between the first geographic location that is associated with the first content item and the second geographic location that is associated with the second content item, whether to present the first content item on the electronic display of the computing device along with the portion of the geographic map; and
in response to determining to present the first content item on the computing device along with the portion of the geographic map, providing, by the system, over a network and to the computing device, data that instructs the computing device to present the first content item along with the portion of the geographic map.

2. The method of claim 1, further comprising:
identifying content item spaces that indicate designated areas of the portion of the geographic map in which content items can be presented;
wherein the data that instructs the computing device to present the first content item along with the portion of the geographic map comprises instructions for presenting the first content item in one of the identified content item spaces.

3. The method of claim 1, further comprising:
receiving user requests for map directions, the map directions each including one or more of a start location on the geographic map and an end location on the geographic map; and
selecting the set of content items based on indications that respective geographic locations associated with the set of content items are relevant to the start location on the geographic map or the end location on the geographic map for one or more of the map directions.

4. The method of claim 1, wherein the set of content items comprises content items that are associated with businesses that are identified as having a negative impact on each other.

5. The method of claim 1, wherein the set of content items comprises content items that are associated with businesses that are identified as having a positive impact on each other.

6. The method of claim 1, wherein determining whether to present the first content item on the electronic display of the computing device along with the portion of the geographic map comprises:
determining a respective value for each content item in the set of content items, wherein the respective value for the first content item is determined based at least on the distance between the first geographic location that is associated with the first content item and the second geographic location that is associated with the second content item; and
selecting, based on the respective values for the set of content items, particular ones of the set of content items to present on the electronic display of the computing device along with the portion of the geographic map.

7. The method of claim 6, comprising determining the respective value for the first content item at least in part by:
identifying a base value for the first content item; and
generating the respective value for the first content item by adjusting the base value based on at least one of:
(i) the distance between the first geographic location that is associated with the first content item and the second geographic location that is associated with the second content item; or
(ii) data that indicates a level of similarity between a first content provider that is associated with the first content item and a second content provider that is associated with the second content item.

8. The method of claim 6, wherein the respective value for each particular content item in the set of content items indicates one or more of a bid value for the particular content item, a click-through rate for the particular content item, and a conversion rate for the particular content item.

9. The method of claim 6, comprising determining, based on a zoom level of the geographic map or a size of a map space that is configured to present the portion of the geographic map, a number of content items to select from the set of content items to present on the electronic display of the computing device along with the portion of the geographic map.

10. The method of claim 1, comprising determining the respective value for the first content item further based on data that indicates a level of similarity between a first content provider that is associated with the first content item and a second content provider that is associated with the second content item.

11. The method of claim 1, wherein the first geographic location that is associated with the first content item and the second geographic location that is associated with the second content item are both located within the geographic area represented by the portion of the geographic map.

12. The method of claim 1, wherein the first content item comprises an advertisement.

13. One or more non-transitory machine-readable storage media storing instructions that are executable to perform operations comprising:
identifying a portion of a geographic map for presentation on an electronic display of a computing device;
identifying a set of content items that are candidates for presentation on the portion of the geographic map and that are each associated with a respective geographic location that is located within a geographic area represented by the portion of the geographic map;

identifying a distance between a first geographic location that is associated with a first content item of the set of content items and a second geographic location that is associated with a second content item of the set of content items;

determining, based at least on the distance between the first geographic location that is associated with the first content item and the second geographic location that is associated with the second content item, whether to present the first content item on the electronic display of the computing device along with the portion of the geographic map; and in response to determining to present the first content item on the computing device along with the portion of the geographic map, providing, over a network and to the computing device, data that instructs the computing device to present the first content item along with the portion of the geographic map.

14. The one or more non-transitory machine-readable storage media of claim 13, wherein determining whether to present the first content item on the electronic display of the computing device along with the portion of the geographic map comprises:

determining a respective value for each content item in the set of content items, wherein the respective value for the first content item is determined based at least on the distance between the first geographic location that is associated with the first content item and the second geographic location that is associated with the second content item; and selecting, based on the respective values for the set of content items, particular ones of the set of content items to present on the electronic display of the computing device along with the portion of the geographic map.

15. The one or more non-transitory machine-readable storage media of claim 14, wherein the operations comprise determining the respective value for the first content item at least in part by:

identifying a base value for the first content item; and generating the respective value for the first content item by adjusting the base value based on at least one of:
(i) the distance between the first geographic location that is associated with the first content item and the second geographic location that is associated with the second content item; or
(ii) data that indicates a level of similarity between a first content provider that is associated with the first content item and a second content provider that is associated with the second content item.

16. The one or more non-transitory machine-readable storage media of claim 14, wherein the respective value for each particular content item in the set of content items indicates one or more of a bid value for the particular content item, a click-through rate for the particular content item, and a conversion rate for the particular content item.

17. The one or more non-transitory machine-readable storage media of claim 14, wherein the operations comprise determining, based on a zoom level of the geographic map or a size of a map space that is configured to present the portion of the geographic map, a number of content items to select from the set of content items to present on the electronic display of the computing device along with the portion of the geographic map.

18. The one or more non-transitory machine-readable storage media of claim 13, wherein the operations comprise determining the respective value for the first content item further based on data that indicates a level of similarity between a first content provider that is associated with the first content item and a second content provider that is associated with the second content item.

19. The one or more non-transitory machine-readable storage media of claim 13, wherein the first geographic location that is associated with the first content item and the second geographic location that is associated with the second content item are both located within the geographic area represented by the portion of the geographic map.

* * * * *

UNITED STATES PATENT AND TRADEMARK OFFICE
CERTIFICATE OF CORRECTION

PATENT NO. : 9,626,781 B2
APPLICATION NO. : 14/682563
DATED : April 18, 2017
INVENTOR(S) : Sergei Vassilvitskii and Mohammad Mahdian It is certified that error appears in the above-identified patent and that said Letters Patent is hereby corrected as shown below:

On the Title Page

Item (12) replace "Vassilvtskii" with --Vassilvitskii--;

Item (72) replace "Vassilvtskii" with --Vassilvitskii--.

Signed and Sealed this
Twenty-second Day of May, 2018

Andrei Iancu
*Director of the United States Patent and Trademark Office*